`United States Patent` [19]

Tanaka et al.

[11] Patent Number: 5,822,212

[45] Date of Patent: Oct. 13, 1998

[54] MACHINING LOAD MONITORING SYSTEM

[75] Inventors: Kunio Tanaka, Akishima; Yasushi Onishi, Minamitsuru-gun, both of Japan

[73] Assignee: Fanuc Ltd, Minamitsuru-gun, Japan

[21] Appl. No.: 911,440

[22] Filed: Aug. 12, 1997

Related U.S. Application Data

[63] Continuation of Ser. No. 403,883, filed as PCT/JP94/01206 published as WO95/04632 Feb. 16, 1995., abandoned.

[30] Foreign Application Priority Data

Aug. 6, 1993 [JP] Japan .................................. 5-195686
Aug. 9, 1993 [JP] Japan .................................. 5-197118

[51] Int. Cl.$^6$ ............................ G06F 19/00; B23Q 17/69
[52] U.S. Cl. ...................... 364/474.16; 364/178; 364/192
[58] Field of Search ............................... 264/184, 185, 264/474.16, 474.17; 364/178, 474.18, 474.19, 191, 192

[56] References Cited

U.S. PATENT DOCUMENTS

| 4,412,162 | 10/1983 | Kitamura ................................ 318/563 |
| 4,536,849 | 8/1985 | Borisch et al. .......................... 364/184 |
| 4,617,635 | 10/1986 | Shimigu .................................. 364/511 |
| 4,749,920 | 6/1988 | Jaeger et al. ............................ 318/650 |
| 4,839,819 | 6/1989 | Begin et al. ............................. 364/483 |
| 5,243,533 | 9/1993 | Takagi et al. .......................... 364/474.17 |
| 5,414,632 | 5/1995 | Mochizuki et al. .................... 364/474.16 |
| 5,428,556 | 6/1995 | Torizawa et al. ...................... 364/551.02 |

FOREIGN PATENT DOCUMENTS

| 59-146741 | 8/1984 | Japan . |
| 60-29807 | 2/1985 | Japan . |
| 3-110606 | 5/1991 | Japan . |
| 3-72429 | 11/1991 | Japan . |

*Primary Examiner*—Paul P. Gordon
*Attorney, Agent, or Firm*—Staas & Halsey

[57] ABSTRACT

A machining load monitoring system to monitor a machining condition by comparing sampled data of a machining load in a trial cutting process and measured data thereof in an actual cutting process with each other precisely with respect to time. An NC command executing unit (1) executes NC commands, and updates a block number and an execution mode in an executed state table (2) when the execution of NC commands of one block is finished. A load monitoring unit (4) compares sampled data, stored in a sampled data table (3), of a machining load in a trial cutting process with measured data thereof in an actual cutting process at given intervals of time. When the block number in the executed state table (2) is updated, sampled data of a new block number are read from the sampled data table (3). The sampled data in the trial cutting process and the measured data in the actual cutting process are compared with each other at predetermined times, and an alarm is issued when the difference between the compared data reaches or exceeds a predetermined level.

13 Claims, 7 Drawing Sheets

MACHINING LOAD MONITORING SYSTEM

This application is a continuation of application Ser. No. 08/403,883, filed Mar. 21, 1995, now abandoned, which is a 371 of PCT/JP4/01206 filed 21 Jul. 1996, published as WO95/04632 Feb. 16, 1995.

TECHNICAL FIELD

The present invention relates to a machining load monitoring system for monitoring a machining load on a numerically controlled machine tool, and more particularly, to a machining load monitoring system for comparing sampled data of a machining load with measured data thereof to monitor a machined condition.

BACKGROUND ART

Numerically controlled machine tools monitor a machining load torque and, when the machining load reaches or exceeds a certain level, issue an alarm to interrupt a machining process or lower a cutting feed speed to reduce the machining load, so that the cutter is prevented from being damaged or the workpiece is prevented from suffering a machining failure. The machining load includes not only a load imposed on a cutter during a cutting process, but also a load applied to a servomotor when it is energized to feed the cutter quickly.

One specific method of monitoring a machining load comprises the steps of cutting a workpiece on a trial basis, sampling data of a machining load at certain intervals of time, and comparing the sampled data with measured data at certain intervals of time when a workpiece is actually cut, for thereby monitoring the machining load.

There has also been known a method of determining a machining load as a disturbant load torque using an observer, as disclosed in Japanese laid-open patent publication No. 3-196313.

According to the method of monitoring a machining load using sampled data, it is difficult to synchronize the timing of a trial cutting process and the timing of an actual cutting process completely with each other. Therefore, the sampled data and the measured data tend to differ in time from each other, and cannot often be compared precisely with each other. For example, if there is a time difference with respect to a completion signal for an auxiliary function signal outputted from a numerical control apparatus, then such a time difference appears directly as a time difference between the two data. Such a time difference is accumulated, and its total value increases with time.

The method of monitoring a machining load using sampled data also has another problem. When a feed rate override function is performed to vary the cutting rate, the timing of a trial cutting process and the timing of an actual cutting process are brought out of synchronization. For example, if the feed rate override function indicates 50% of the cutting speed, then the speed of the actual cutting process becomes 50% of the speed of the trial cutting process, making it impossible to compare the machining loads in the trial cutting process and the actual cutting process with each other.

DISCLOSURE OF THE INVENTION

In view of the aforesaid problems, it is an object of the present invention to provide a machining load monitoring system which is capable of comparing data in a trial cutting process and data in an actual cutting process with each other precisely with respect to time.

Another object of the present invention to provide a machining load monitoring system which is capable of comparing sampled data in a trial cutting process and data in an actual cutting process with each other precisely with respect to time even when a feed rate override function is performed.

To achieve the above objects, there is provided in accordance with the present invention a machining load monitoring system for monitoring a machining load on a numerically controlled machine tool, comprising an executed state table for storing a block number which is being executed, NC command executing means for executing NC commands and updating the block number stored in the executed state table as NC commands are executed, a sampled data table for storing sampled data of a machining load produced in a trial cutting process, with respect to blocks of NC commands, and load monitoring means for comparing the sampled data with measured data of the machining load in an actual cutting process at predetermined intervals of time, replacing the sampled data with sampled data of a new block number when the block number is changed, and issuing an alarm when the difference between the machining load in the actual cutting process and the sampled data reaches or exceeds a predetermined level.

The NC command executing means executes NC commands, and updates a block number and an execution mode in the executed state table when the execution of NC commands of one block is finished.

The load monitoring means compares sampled data, stored in the sampled data table, of a machining load in a trial cutting process with measured data thereof in an actual cutting process at given intervals of time. When the block number in the executed state table is updated, sampled data of a new block number are read from the sampled data table.

The sampled data in the trial cutting process and the measured data in the actual cutting process are compared with each other at predetermined times, and an alarm is issued when the difference between the compared data reaches or exceeds a predetermined level.

According to the present invention, there is also provided a machining load monitoring system for monitoring a machining load on a numerically controlled machine tool, comprising a sampled data table for storing sampled data of a machining load produced in a trial cutting process, sampling period generating means responsive to an override signal for outputting a sampling period signal corresponding to the override signal, sampled data reading means for reading sampled data from the sampled data table according to the sampling period signal, sampled data correcting means for correcting the read sampled data with the override signal and outputting corrected sampled data, and load monitoring means for comparing the corrected sampled data with measured data of the machining load in an actual cutting process at predetermined intervals of time, and issuing an alarm when the difference between the machining load in the actual cutting process and the sampled data reaches or exceeds a predetermined level.

The sampled data table stores sampled data of a machining load produced in a trial cutting process. The sampling period generating means is responsive to an override signal for outputting a sampling period signal corresponding to the override signal. For example, if the override signal indicates 100% of the cutting speed, the sampling period generating means generates a period signal representing the same period as the sampling period of the trial cutting process, and if the override signal indicates 50% of the cutting speed, the sampling period generating means generates a period signal representing the period which is twice the sampling period of the trial cutting process.

The sampled data reading means reads sampled data from the sampled data table according to the sampling period signal. The sampled data are corrected by the sampled data correcting means, which outputs corrected sampled data.

The load monitoring means compares the corrected sampled data with measured data of the machining load in an actual cutting process at predetermined intervals of time, and issues an alarm when the difference between the compared data reaches or exceeds a predetermined level.

BEST MODE FOR CARRYING OUT THE INVENTION

An embodiment of the present invention will hereinafter be described below with reference to the drawings.

First, the concept of a machining load monitoring system according to the present invention will be described below.

Figure 1:
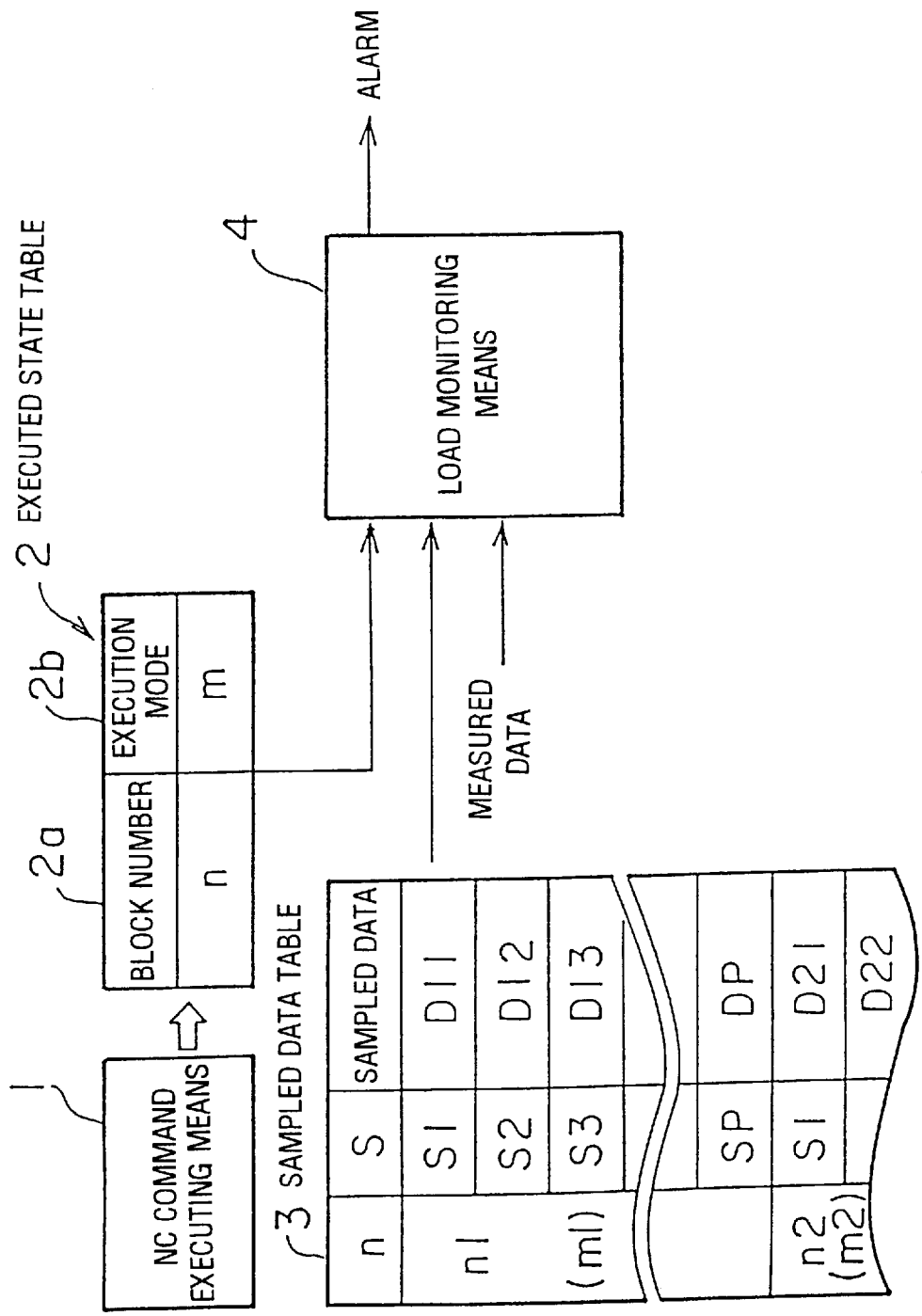
FIG. 1 is a block diagram showing the concept of a machining load monitoring system according to the present invention.

FIG. 1 shows in block form the concept of a machining load monitoring system according to the present invention. NC command executing means 1 serves to normally execute NC commands. An executed state table 2 has a block number column 2a and an execution mode column 2b. The block number column 2a stores the block number "n" of an NC command being executed which is written by the NC command executing means 1. The block numbers are allotted to successive blocks of NC commands. The execution mode column 2b stores the mode "m" of a block being executed which is written by the NC command executing means 1. There are three available execution modes as follows:

0: Cutting mode a mode indicating that a machine tool is actually cutting a workpiece (NC commands: G01, G02, G03, etc.)

1: Fast feed mode a mode indicative of a fast feed (NC commands: G00, etc.)

2: Non-motion mode a mode not accompanied by the motion of an axis (NC commands: M command, T command, S command)

A sampled data table 3 stores sampled data of the respective blocks which are produced when a trial cutting process is carried out. The sampled data are stored for respective blocks n1, n2, . . . The sampled data table 3 stores modes m1, m2, . . . of the blocks in its block number column, and also stores data D11, D12, D13, . . . , Dp, D21, D22, D23, . . . at respective times. The data are representative of cutting load torques of a spindle motor.

Load monitoring means 4 compares the sampled data (D11, D12, D13, ) with measured data at the respective times, and outputs an alarm when the difference between the sampled data and the measured data reaches or exceeds a certain level with respect to the sampled data.

Concurrent with the comparison of the sampled data and the measured data, the block number in the executed state table 2 is monitored at all times. When an actual cutting process progresses faster than the trial cutting process and the block number in the executed state table 2 is renewed, sampled data to be read jump to the sampled data of the next block number. Therefore, even if a time difference is developed between the sampled data and the measured data, such a time difference is not accumulated, but the sampled data and the measured data are synchronized when blocks are changed.

When the actual cutting process progresses slower than the trial cutting process, sampled data to be read do not jump to the sampled data of the next block number, but remain to be the sampled data in use.

Figure 2:
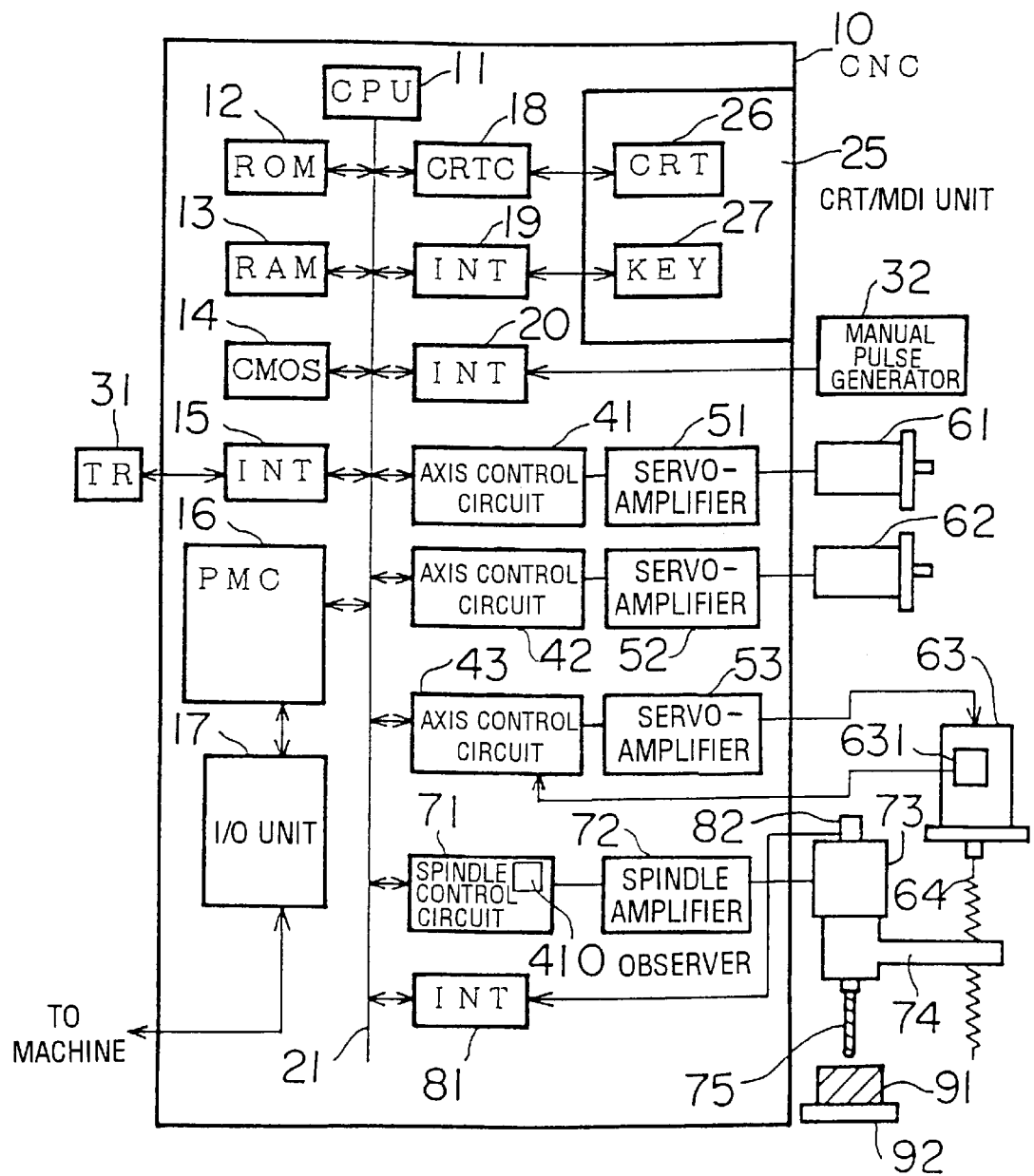
FIG. 2 is a block diagram of a hardware arrangement of a computerized numerical control (CNC) apparatus for implementing the machining load monitoring system according to the present invention.

FIG. 2 shows in block form a hardware arrangement of a computerized numerical control (CNC) apparatus which implements the machining load monitoring system according to the present invention. As shown in FIG. 2, the computerized numerical control (CNC) apparatus is indicated by the reference numeral 10. The computerized numerical control apparatus 10 has a central processor (CPU) 11 for controlling the computerized numerical control apparatus 10 in its entirety. The central processor 11 reads a system program stored in a read-only memory (ROM) 12 through a bus 21, and executes control over the computerized numerical control apparatus 10 in its entirety according to the system program. A random-access memory (RAM) 13 stores temporary calculated data and display data. The random-access memory 13 comprises an SRAM or the like. A nonvolatile memory (CMOS) 14 stores a machining program and various parameters. The nonvolatile memory 14 is backed up by a battery (not shown), so that the stored data will be retained in the event of a power failure of the computerized numerical control apparatus 10.

An interface 15 serves to interface the computerized numerical control apparatus 10 with an external device 31 which may be a tape reader, a tape puncher, or a tape reader/puncher. A machining program can be read from the external device 31 which comprises a tape reader through the interface 15, and a machining program edited in the computerized numerical control apparatus 10 can be outputted to the external device 31 which comprises a tape puncher through the interface 15.

A programmable machine controller (PMC) 16 is provided in the computerized numerical control apparatus 10 for controlling a machine tool according to a sequence program which is generated in ladder form. Specifically, the programmable machine controller 16 converts an M function, an S function, and a T function which are commanded by the machining program, into signals required by the machine tool according to the sequence program, and outputs the converted signals from an input/output (I/O) unit 17. The outputted signals are supplied to energize electromagnets on the machine tool and operates hydraulic valves, pneumatic valves, and electric actuators. The programmable machine controller 16 also processes signals from limit switches on the machine tool and switches on a machine control console (not shown), and delivers the processed signals to the processor 11.

A graphic control circuit 18 converts digital data including the present positions of the axes, alarms, parameters, and image data into image signals, which are sent to a display device 26 of a CRT/MDI (Cathode-Ray Tube/Manual Data Input) unit 25, and displayed on the display device 26. An interface 19 receives data from a keyboard 27 in the CRT/MDI unit 25, and delivers the received data to the processor 11.

An interface 20 is connected to a manual pulse generator 32 for receiving pulses generated by the manual pulse generator 32. The manual pulse generator 32 is mounted on the machine control console for manually positioning mechanical operable parts accurately.

Axis control circuits 41~43 receive motion commands for the respective axes from the processor 11, and outputs commands for the respective axes to servoamplifiers 51~53, respectively. In response to the commands, the servoamplifiers 51~53 energize respective servomotors 61~63 for the respective axes. The servomotor 63 which controls the feeding of a Z-axis rotates a ball screw 64 to control the position and feeding velocity of a spindle head 74 connected to a spindle motor 73 in the direction of the Z-axis. The servomotor 63 has a built-in pulse coder 631 for detecting the position of the spindle head 74. A positional signal from the pulse coder 631 is fed as a pulse train back to the axis control circuit 43. Although not shown, the servomotors 61, 62 which control the feeding of X- and Y-axes, respectively, have respective built-in pulse coders for positional detection. These pulse coders also feed positional signals as pulse trains back to the axis control circuits 41, 42. Linear scales may be used as such position detectors. The pulse trains may be converted into a velocity signal by way of F/V (frequency-to-velocity) conversion.

The axis control circuit 43 has a processor (not shown) for executing software processing.

A spindle control circuit 71 receives a spindle rotation command and a spindle orientation command, and outputs a spindle velocity signal to a spindle amplifier 72. In response to the spindle velocity signal, the spindle amplifier 72 energizes the spindle motor 73 to rotate at a rotational velocity commanded by the spindle rotation command. The spindle amplifier 72 also positions the spindle at a position indicated by the spindle orientation command.

A position coder 82 is coupled to the spindle motor 73 through gears or a belt. The position coder 82 rotates in synchronism with the spindle motor 73, and outputs feedback pulses through an interface 81 to the processor 11 which reads the feedback pulses. The feedback pulses serve to move the other axes synchronously with the spindle motor 73 to make it possible to effect machining such as drilling.

The feedback pulses are converted by the processor 11 into a velocity signal which is sent as a velocity signal for the spindle motor 73 to the spindle control circuit 71.

The spindle control circuit 71 has an observer 410 for estimating a disturbant load torque (described later on). The observer 410 estimates a disturbant load torque from which an acceleration component of the spindle motor 73 has been excluded, and determines a machining load from the disturbant load torque.

A drill bit 75 is mounted on the spindle head 74 of the spindle motor 73. The rotation of the drill bit 75 is controlled by the spindle motor 73. The position and feeding velocity of the drill bit 75 in the direction of a Z-axis are controlled by the servomotor 63 through the spindle head 74.

The drill bit 75 is fed and positioned in the Z-axis direction by the servomotor 63 for drilling a workpiece 91.

The workpiece 91 is fixedly mounted on a table 92 which is controlled to move in the X- and Y-axis directions by the respective X- and Y-axis servomotors 61, 62 through mechanisms, not shown.

Figure 3:
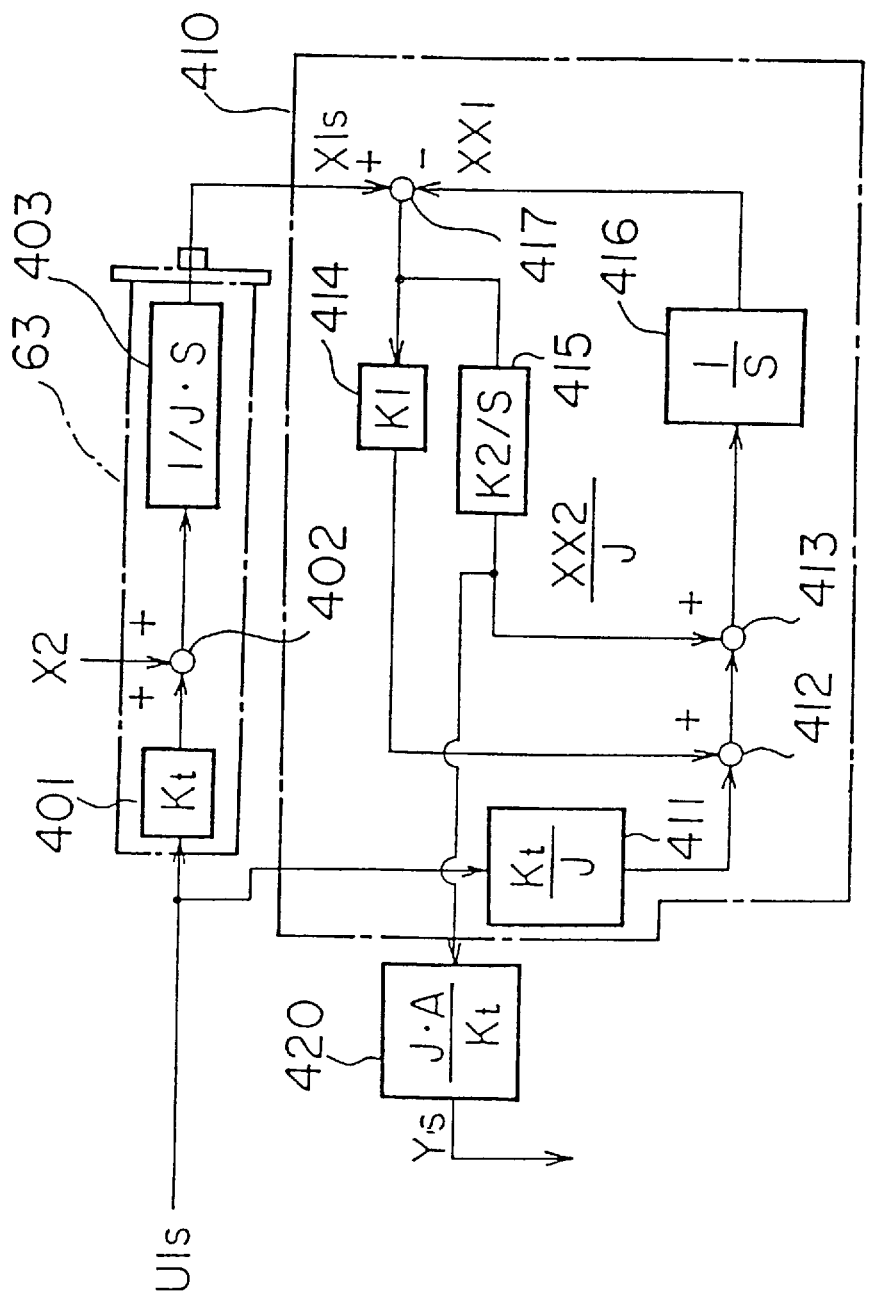
FIG. 3 is a block diagram of an observer for estimating a disturbant load torque.

The observer 410 for estimating a disturbant load torque will be described below. FIG. 3 shows in block form an observer for estimating a disturbant load torque. The disturbant load torque includes disturbant load torques such as a cutting load torque, a frictional torque of mechanisms, and so on, and is equal to all torques of the spindle motor except for acceleration and deceleration torques for accelerating and decelerating the spindle motor. Therefore, the disturbant load torque can be regarded as a cutting load torque if the frictional torque of mechanisms is ignored.

In FIG. 3, a current command value U1s is a torque command value which is outputted to the spindle motor 73 in response to a spindle rotation command from the processor 11. The current command value U1s is applied to an element 401 to energize the spindle motor 73. To an output torque of the spindle motor 73, there is added a disturbant load torque X2 by an arithmetic element 402. An output signal from the arithmetic element 402 is converted into a velocity signal X1s by an element 403 where Kt, J represent the torque constant and inertia, respectively, of the spindle motor 73.

The current command value U1s is also applied to the observer 410. The observer 410 estimates a disturbant load torque from the current command value U1s and the velocity X1s of the spindle motor 73. Velocity control of the spindle motor 73 is omitted here, and only processing operations for estimating a disturbant load torque will be described below. The current command value U1s is multiplied by (Kt/J) by an element 411, and then outputted to an arithmetic element 412. To the output signal from the element 411, there is added a feedback signal from a proportional element 414 by the arithmetic element 412, and then there is added a feedback signal from an integral element 415 by an arithmetic element 413. Output signals from the arithmetic elements 412, 413 are expressed in a unit of acceleration. The output signal from the arithmetic element 413 is applied to an integral element 416, which outputs an estimated velocity XX1 for the spindle motor 73.

The difference between the estimated velocity XX1 and the actual velocity X1s is determined by an arithmetic element 417, and fed back to the proportional element 414 and the integral element 415. The proportional element 414 has a proportionality constant K1 which is expressed in a unit of sec$^{-1}$. The integral element 415 has an integration constant K2 which is expressed in a unit of sec$^{-2}$.

The output signal (XX2/J) of the integral element 415 is determined by the following equation:

$$(XX2/J)=(X1s-XX1)\cdot(K2/S)=(X2/J)\cdot[K2/(S^2+K1\cdot S+K2)].$$

By selecting the constants K1, K2 in order to stabilize the polarity, the above equation is expressed as follows:

$$(XX2/J)\approx(X2/J)\ XX2\approx X2.$$

Therefore, the disturbant load torque X2 can be estimated by XX2. The output signal from the integral element 415 is representative of an estimated acceleration (XX2/J) which is produced by dividing an estimated disturbant load torque XX2 by J, and is converted into a current value by a proportional element 420. For a torque representation, the current value is represented by an estimated disturbant load torque Ys. J represents the inertia of the spindle motor 73 as with J in the element 403, and Kt is the same as the torque constant of the element 401. A represents a coefficient which is of a numerical value of 1 or less and used to correct the estimated acceleration (XX2/J). In this manner, the disturbant load torque Ys (X2) of the spindle motor 73 can be estimated using the observer 410. Though the estimated disturbant load torque Ys is of an estimated value, it will be referred to as a disturbant load torque below. Ignoring the frictional torque of the mechanisms, the estimated disturbant load torque Ys can be regarded as a cutting load torque.

Figure 4:
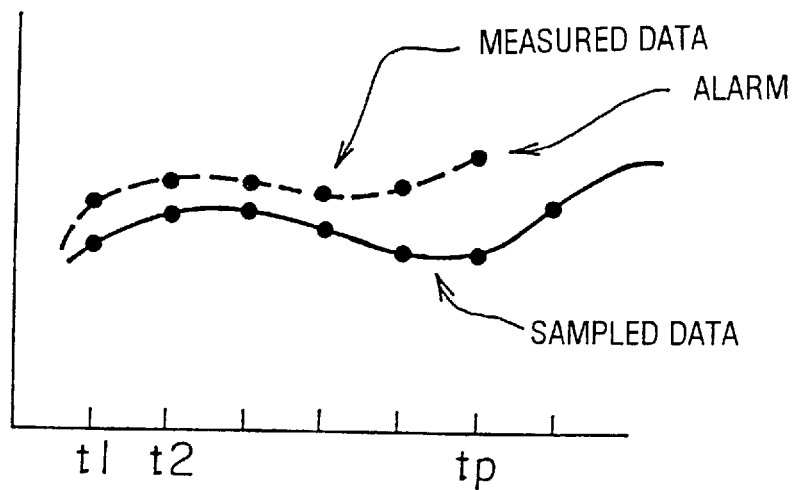
FIG. 4 is a diagram showing a comparison between sampled data and measured data.

A comparison between sampled data produced in a trial cutting process and measured data produced in an actual cutting process will be described below. FIG. 4 is a diagram showing a comparison between sampled data and measured data. In FIG. 4, the horizontal axis represents a time base and the vertical axis the cutting load torque of the spindle motor 73. As shown in FIG. 4, sampled data of the machining load and measured data thereof are compared at times (t1, t2, t3, . . . , tp, . . . ). An alarm is issued when the difference between the sampled data and the measured data reaches or exceeds a certain level with respect to the sampled data at the time tp, for example. The computerized numerical control apparatus stops the machining process or lowers the cutting speed to reduce the load. If necessary, the cutter may be replaced.

Figure 5:
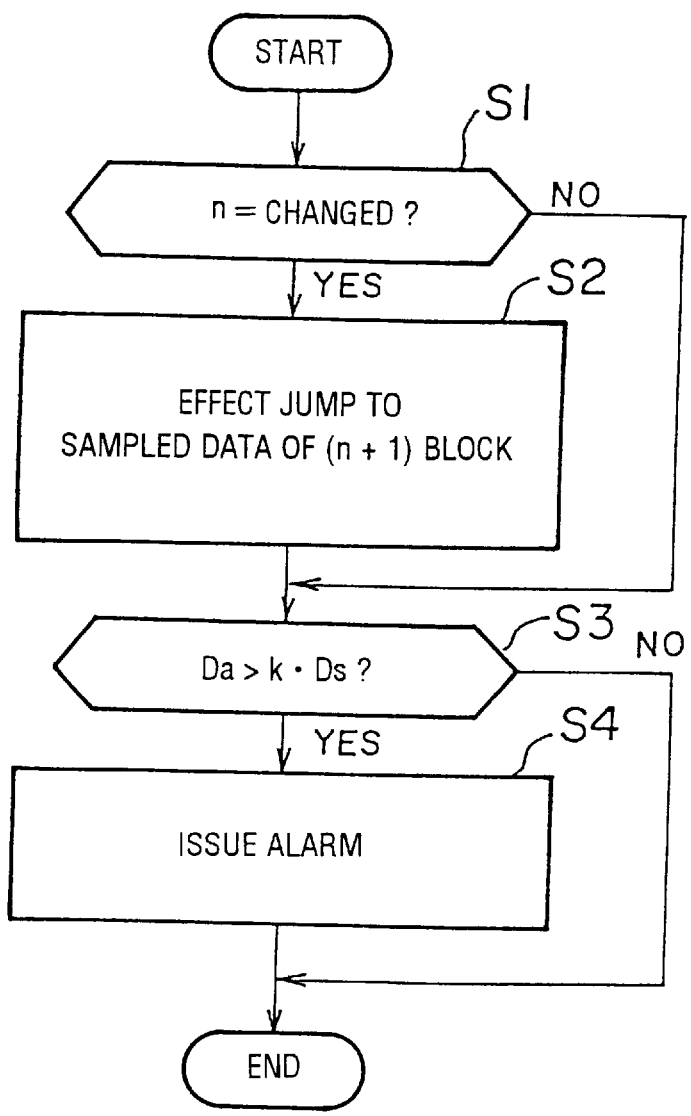
FIG. 5 is a flowchart of a processing sequence of load monitoring means.

A processing operation of the load monitoring means 4 will be described in detail below. FIG. 5 is a flowchart of a processing sequence of the load monitoring means 4. Numerals following the letter "S" in FIG. 5 represent step numbers.

[S1] The load monitoring means 4 determines whether the block number "n" in the executed state table 2 has changed or not. If it has changed, control proceeds to a step S2, and if not changed, control goes to a step S3.

[S2] A jump occurs to sampled data of a next block number (n+1), and the sampled data start to be read.

[S3] Sampled data Ds and measured data Da are compared with each other. If the measured data Da are greater than a value k·Ds which is produced by multiplying the sampled data Ds by a coefficient "k", then control goes to a step S4. If the measured data Da are not greater than the value k·Ds, then the processing sequence comes to an end. The coefficient "k" has a value ranging from about 1.1 to 1.5.

[S4] Since the difference between the sampled data Ds and the measured data Da is equal to or greater than a certain value, an alarm is issued. The machining process is stopped, the alarm is displayed, the feed rate is lowered, and the cutter is replaced.

If necessary, an alarm may be issued when the measured data Da are smaller than the sampled data Ds by at least a certain value, allowing a failure of normal machining operation due to cutter damage or the like to be detected. The above processing operation is carried out by the processor (CPU) 11 shown in FIG. 2.

In the above description, the measured data of the cutting load on the spindle motor are compared with the sampled data to monitor the machining load. A machining load with respect to a feed axis (an X-axis, a Y-axis, or a Z-axis) may also be monitored by comparing measured data of a cutting load with sampled data thereof. To this end, it is necessary to add an observer for estimating a disturbant load torque to an axis control circuit.

A collision between the cutter and the workpiece may be detected by comparing the measured data of the cutting load on the spindle motor with the sampled data in a cutting mode and comparing sampled data of a load on a feed axis with a measured load in a fast feed mode.

The above machining load monitoring process has been described as being carried out by a software program for the processor 11 of the computerized numerical control apparatus 10, i.e., a CNC software program. However, the machining load monitoring process may be carried out by a sequence program for the programmable machine controller 16. A special device for effecting such a processing operation may be connected to the computerized numerical control apparatus 10.

With the present invention, as described above, when the block number of an NC command is changed, a jump occurs to the sampled data of a next block to synchronize sampled data of a machining load with measured data thereof with respect to time. Therefore, a machining condition can accurately be monitored.

Figure 6:
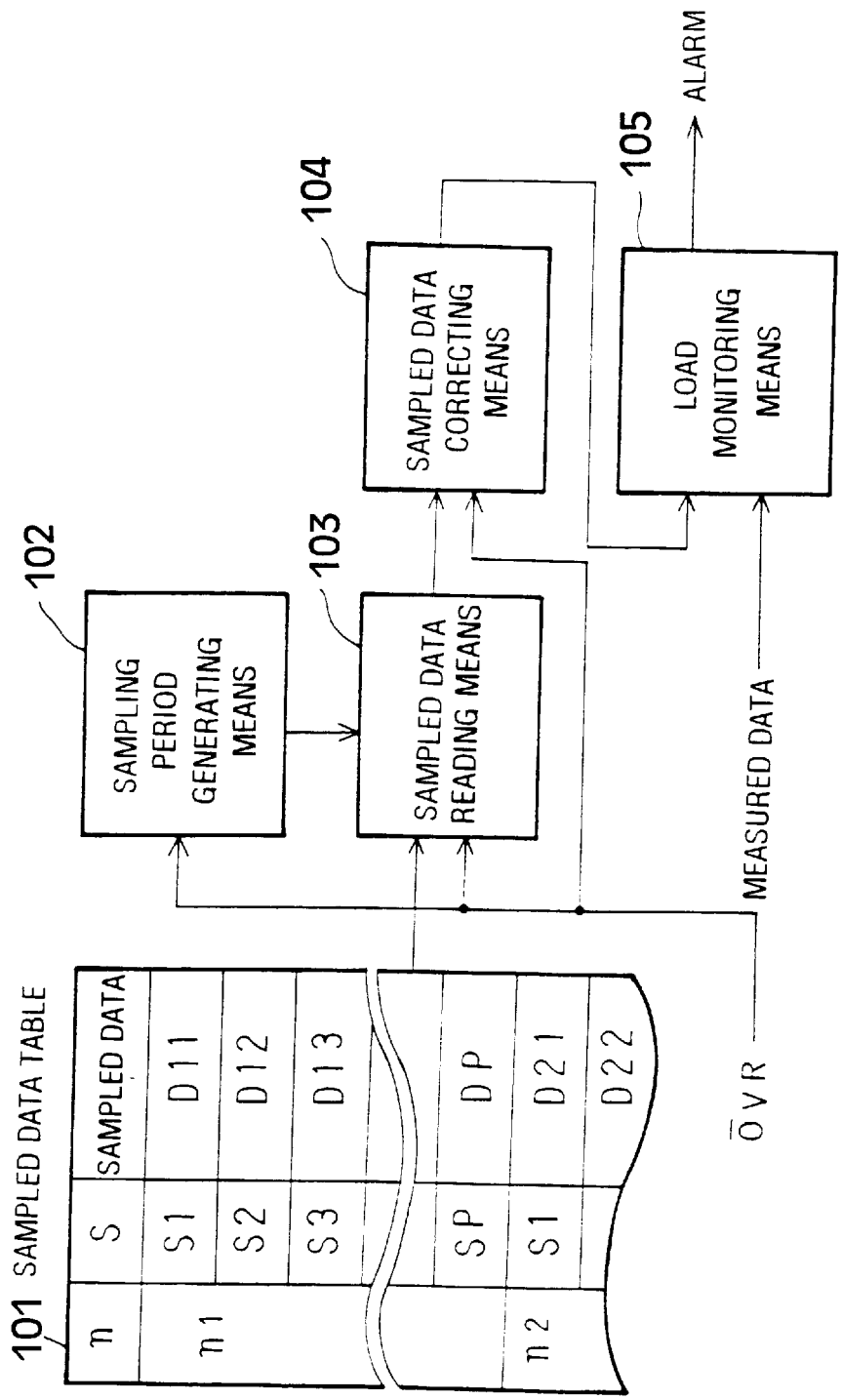
FIG. 6 is a block diagram showing the concept of another machining load monitoring system according to the present invention.

The concept of another machining load monitoring system according to the present invention will be described below. FIG. 6 shows in block form the concept of another machining load monitoring system according to the present invention. The relationship between sampled data and measured data is the same as that described above with reference to FIG. 4.

A sampled data table 101 stores sampled data of respective blocks which are produced when a trial cutting process is carried out. At this time, a feed rate override function indicates 100% of the cutting speed. The sampled data are stored for respective blocks n1, n2, . . . . The sampled data table 1 stores data D11, D12, D13, . . . , Dp, D21, D22, D23, . . . at respective times. The data are representative of cutting load torques of a spindle motor.

Sampling period generating means 2 outputs a sampling period signal in response to an override signal OVR. For example, if the feed rate override function indicates 100% of the cutting speed, then the sampling period generating means 102 outputs a sampling period signal indicative of the same period as the sampling period of the trial cutting process, and if the feed rate override function indicates 50% of the cutting speed, then the sampling period generating means 102 outputs a sampling period signal indicative of the period which is twice the sampling period of the trial cutting process.

Sampled data reading means 103 reads sampled data (D11, D12, D13, . . . ) from the sampled data table 1 according to the sampling period signal.

The sampled data read from the sampled data table 1 are corrected by sampled data correcting means 104, which outputs corrected sampled data. When a feed rate override function is performed, the machining load is varied, and the sampled data cannot be used as they are. Therefore, the sampled data are corrected according to the override signal by the sampled data correcting means 104. For example, if the feed rate override function indicates 120% of the cutting speed, then the feed rate increases by 20%, and the machining load increases correspondingly, and if the feed rate override function indicates 80% of the cutting speed, then the feed rate decreases by 20%, and the machining load decreases correspondingly.

Figure 7:
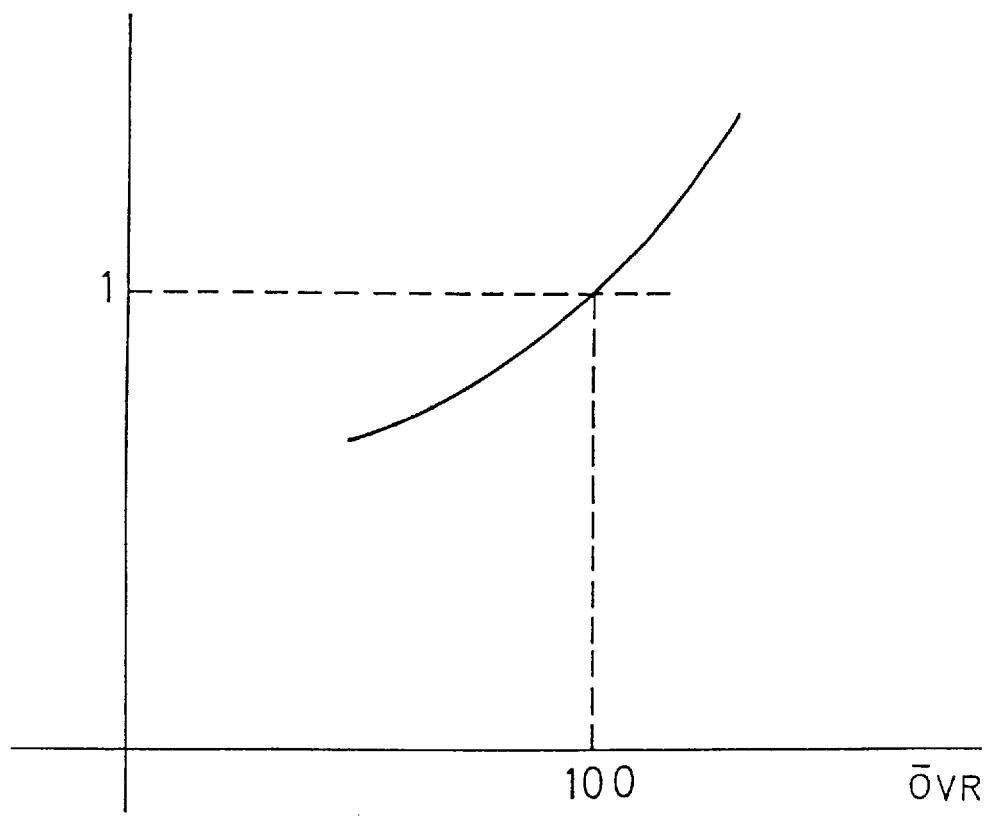
FIG. 7 is a diagram showing the relationship between a feed rate override function and a corrective coefficient.

FIG. 7 illustrates the relationship between the feed rate override function and the corrective coefficient. In FIG. 7, the horizontal axis represents the value of the feed rate override function and the vertical axis the corrective coefficient of the sampled data correcting means 104. The curve shown in FIG. 7 indicates that if the feed rate override function indicates 100% of the cutting speed, then the corrective coefficient is "1", and that as the feed rate override function increases, the corrective coefficient increases, and as the feed rate override function decreases, the corrective coefficient decreases. The curve shown in FIG. 7 is determined depending on the material of the workpiece, the machining conditions, etc. The curve may be approximated by a straight curve in the vicinity of 100% of the feed rate override function which is used most possibly.

Referring back to FIG. 6, load monitoring means 105 compares the sampled data that have been corrected by the sampled data correcting means 104 with measured data produced when the workpiece is actually cut, and outputs an alarm when the difference between the sampled data and the measured data reaches or exceeds a certain level.

Then, the machining process is stopped, the alarm is displayed, the feed rate is lowered, and the cutter is replaced.

If necessary, an alarm may be issued when the measured data are smaller than the sampled data by at least a certain value, allowing a failure of normal machining operation due to a cutter damage or the like to be detected. The above processing operation is carried out by the processor (CPU) 11 shown in FIG. 2.

In the above description, the measured data of the cutting load on the spindle motor are compared with the sampled data to monitor the machining load. A machining load with respect to a feed axis (an X-axis, a Y-axis, or a Z-axis) may also be monitored by comparing measured data of a cutting load with sampled data thereof. To this end, it is necessary to add an observer for estimating a disturbant load torque to an axis control circuit.

The above machining load monitoring process has been described as being carried out by a software program for the processor 11 of the computerized numerical control apparatus 10, i.e., a CNC software program. However, the machining load monitoring process may be carried out by a sequence program for the programmable machine controller 16. A special device for effecting such a processing operation may be connected to the computerized numerical control apparatus 10.

In the above embodiments, the drilling process has been described by way of example. However, the principles of the present invention are also applicable to a milling process, a turning process, a grinding process, or the like.

With the present invention, as described above, the sampling period of sampled data of a machining load which are produced when the workpiece is cut in a trial cutting process is varied depending on the override signal, and the sampled data are corrected according to the override signal and compared with measured data of the machining load which are produced when the workpiece is actually cut. Consequently, the machining load can accurately be monitored even when a feed rate override function is performed.

We claim:

1. A machining load monitoring system for monitoring a machining load on a numerically controlled machine tool, comprising:
    an executed state table for storing a block number of one of a plurality of NC commands which is being executed, wherein the NC commands are divided into blocks with corresponding block numbers;
    NC command executing means for executing the NC commands and updating the block number of the one NC command stored in said executed state table, as the NC commands are executed;
    a sampled data table for storing sampled data of a machining load produced in a trial cutting process, with respect to the blocks of the NC commands; and
    load monitoring means for monitoring the block number of the one NC command and a block number of the sampled data, selecting the sampled data having a synchronized block number as the one NC command and changing the sampled data if necessary to synchronize the block numbers of the sampled data and one NC command, comparing the synchronized sampled data with measured data of the machining load in an actual cutting process during execution of the one NC command at predetermined intervals of time, replacing the synchronized sampled data with sampled data of a next block number when a next block number of a next NC command is stored in said executed state table, and issuing an alarm when the difference between the measured data of the machining load in the actual cutting process and the synchronized sampled data reaches or exceeds a predetermined level.

2. A machining load monitoring system according to claim 1, wherein said machining load comprises a load torque of a spindle motor.

3. A machining load monitoring system according to claim 1, wherein said machining load comprises a load torque of a feed axis.

4. A machining load monitoring system according to claim 1, wherein said executed state table stores an execution mode of the one NC command being executed.

5. A machining load monitoring system according to claim 4, wherein said execution mode is either a cutting mode, a fast feed mode, or a non-motion mode.

6. A machining load monitoring system according to claim 1, further comprising an observer for estimating the machining load.

7. A machining load monitoring system for monitoring a machining load on a numerically controlled machine tool, comprising:
    a sampled data table for storing sampled data of a machining load produced in a trial cutting process;
    sampling period generating means responsive to an override signal which indicates a change in an intended cutting speed of the numerically controlled machine tool, for outputting a sampling period signal corresponding to said override signal;
    sampled data reading means for reading sampled data from said sampled data table according to said sampling period signal;
    sampled data correcting means for correcting the read sampled data based upon said override signal and outputting corrected sampled data; and
    load monitoring means for comparing the corrected sampled data with measured data of the machining load in an actual cutting process at predetermined intervals of time, and issuing an alarm when the difference between the measured data of the machining load in the actual cutting process and the corrected sampled data reaches or exceeds a predetermined level.

8. A machining load monitoring system according to claim 7, wherein said machining load comprises a load torque of a spindle motor.

9. A machining load monitoring system according to claim 7, wherein said machining load comprises a load torque of a feed axis.

10. A machining load monitoring system according to claim 7, further comprising an observer for estimating said machining load.

11. A machining load monitoring system according to claim 1, wherein said load monitoring means jumps to the next block number of sampled data in said sampled data table until the block numbers of the sampled data and the one NC command are synchronized if the actual cutting process proceeds faster than the trial cutting process.

12. A machining load monitoring system according to claim 1, wherein said load monitoring means jumps to the next block number of sampled data in said sampled data table until the block numbers of the sampled data and the one NC command are synchronized if the actual cutting process proceeds faster than the trial cutting process, and said load monitoring means maintains the previous sampled data in said sampled data table when the block number of next sampled data is different from the block number of the NC command which is being executed until the next NC command is executed and then the block numbers of the sampled data and the NC command are synchronized if the actual cutting process proceeds slower than the trial cutting process.

13. A machining load monitoring system for monitoring a machining load on a numerically controlled machine tool, comprising:

an executed state table for storing a block number of one of a plurality of NC commands which is being executed, wherein the NC commands are divided into blocks with corresponding block numbers;

an NC command execution unit for executing the NC commands and updating the block number of the one NC command stored in said executed state table, as the NC commands are executed;

a sampled data table for storing sampled data of a machining load produced in a trial cutting process, with respect to the blocks of the NC commands; and a sampling period generator responsive to an override signal which indicates a change in an intended cutting speed of the numerically controlled machine tool, to output a sampling period signal corresponding to said override signal;

a sampled data reader to read sampled data from said sampled data table according to said sampling period signal;

a sampled data correction unit to correct the read sampled data based upon said override signal and outputting corrected sampled data; and a load monitor to monitor the block number of the one NC command and a block number of the corrected sampled data, selecting the corrected sampled data having a synchronized block number as the one NC command and changing the corrected sampled data if necessary to synchronize the block numbers of the corrected sampled data and one NC command, comparing the synchronized corrected sampled data with measured data of the machining load in an actual cutting process during execution of the one NC command at predetermined intervals of time, replacing the synchronized corrected sampled data with corrected sampled data of a next block number when a next block number of a next NC command is stored in said executed state table, and issuing an alarm when the difference between the measured data of the machining load in the actual cutting process and the synchronized corrected sampled data reaches or exceeds a predetermined level.

* * * * *